United States Patent
Voss et al.

(10) Patent No.: US 12,319,157 B2
(45) Date of Patent: Jun. 3, 2025

(54) ANTI-BUCKLING CABLES, SYSTEMS, AND METHODS FOR IMPACT-ATTENUATING SHEAR PLATES OF BATTERY ASSEMBLIES

(71) Applicant: GM GLOBAL TECHNOLOGY OPERATIONS LLC, Detroit, MI (US)

(72) Inventors: Mark A. Voss, Richmond, MI (US); Edward D. Moss, Commerce Township, MI (US); Christopher A. Michaels, Milford, MI (US); Bhavesh Shah, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 492 days.

(21) Appl. No.: 17/893,532

(22) Filed: Aug. 23, 2022

(65) Prior Publication Data

US 2024/0067002 A1 Feb. 29, 2024

(51) Int. Cl.
*B60L 50/64* (2019.01)
*H01M 10/04* (2006.01)
(Continued)

(52) U.S. Cl.
CPC ......... *B60L 50/64* (2019.02); *H01M 10/0481* (2013.01); *H01M 10/052* (2013.01);
(Continued)

(58) Field of Classification Search
CPC . B60L 50/64; H01M 10/0481; H01M 10/052; H01M 50/204; H01M 50/249;
(Continued)

(56) References Cited

U.S. PATENT DOCUMENTS 8,733,487 B2   5/2014  Usami et al.
8,911,892 B2   12/2014 Lent et al.
(Continued)

FOREIGN PATENT DOCUMENTS

DE    102013203434 A1   8/2014
DE    102015011898 A1   10/2016
WO    WO-2020026961 A1 *  2/2020

*Primary Examiner* — Jacob B Meyer
(74) *Attorney, Agent, or Firm* — Quinn IP Law

(57) ABSTRACT

Presented are anti-buckling cables for battery assembly shear plates, methods for making/using such anti-buckling cables, and electric-drive vehicles equipped with traction battery packs having impact-attenuating shear plates joined by anti-buckling cables. A battery assembly includes multiple battery cells, such as lithium-class prismatic, pouch, or can-type cells arranged in rows and columns, that are housed inside a protective battery container, such as an electrically insulated battery pack housing. A pair of rigid, impact-attenuating (top and bottom) shear plates is attached to opposing (top and bottom) sides of the battery container, sandwiching therebetween the battery cells. An engineered pattern of tether cables extends through the battery container with cable each rigidly secured at opposing ends thereof to the two shear plates. The tether cables are electrically non-conductive and structurally join together the vertically spaced, mutually parallel shear plates. Each of the tether cables may be continuously tensioned between the shear plates.

20 Claims, 4 Drawing Sheets

(51) Int. Cl.
  *H01M 10/052*    (2010.01)
  *H01M 50/204*    (2021.01)
  *H01M 50/249*    (2021.01)
  *H01M 50/291*    (2021.01)
  *H01M 50/293*    (2021.01)
  *H01M 50/502*    (2021.01)

(52) U.S. Cl.
  CPC ....... *H01M 50/204* (2021.01); *H01M 50/249* (2021.01); *H01M 50/291* (2021.01); *H01M 50/293* (2021.01); *H01M 50/502* (2021.01); *H01M 2220/20* (2013.01)

(58) Field of Classification Search
  CPC ............. H01M 50/291; H01M 50/293; H01M 50/502; H01M 2220/20
  See application file for complete search history.

(56) References Cited

U.S. PATENT DOCUMENTS

| | | |
|---|---|---|
| 8,936,126 B2 | 1/2015 | Nitawaki et al. |
| 8,950,536 B2 | 2/2015 | Maguire et al. |
| 9,022,152 B2 | 5/2015 | Imamura et al. |
| 9,236,592 B2 | 1/2016 | Sundararajan et al. |
| 9,650,003 B2 | 5/2017 | Owens et al. |
| 9,937,781 B1 | 4/2018 | Bryer et al. |
| 10,661,840 B1 | 5/2020 | Saje et al. |
| 11,208,155 B2 | 12/2021 | Aitharaju et al. |
| 2013/0248267 A1 | 9/2013 | Nitawaki |
| 2024/0067002 A1* | 2/2024 | Voss ................... H01M 50/204 |

* cited by examiner

ANTI-BUCKLING CABLES, SYSTEMS, AND METHODS FOR IMPACT-ATTENUATING SHEAR PLATES OF BATTERY ASSEMBLIES

INTRODUCTION

The present disclosure relates generally to electric-drive vehicles, including full-electric and hybrid-electric designs. More specifically, aspects of this disclosure relate to traction battery packs with shear plates for impact attenuation during dynamic loading.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds and ranges, contemporary traction battery packs group multiple battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

Automobile chassis frames are designed to support the vehicle's powertrain components, steering and braking systems, passengers, cargo, etc., during static loading, and to contribute toward vehicle stiffness and impact attenuation during dynamic loading. Some chassis frames—including body-on-frame and unibody "monocoque" architectures—employ a ladder-like underbody construction with a pair of opposing side rails or rocker panels connected by a series of transversely oriented cross members. Projecting forward from front ends of the rocker panels/side rails may be respective front rails connected via one or more front cross members to cooperatively define a front cradle. In the same vein, projecting rearward from rear ends of the rocker panels/side rails may be respective rear rails connected via one or more rear cross member to cooperatively define a rear subframe. Many HEV configurations operatively support the engine, transmission, and front suspension with the front cradle, and operatively support the traction motor, fuel tank, and rear suspension with the rear subframe. To this end, many electric-drive vehicles support the weight of the battery pack on a dedicated support tray or "battery pan," which is anchored to the chassis frame and packaged within a rear trunk compartment, underneath a rear passenger bench seat, or underneath the floor of the passenger compartment.

SUMMARY

Presented herein are anti-buckling cable systems for shear plates of battery assemblies, methods for manufacturing and methods for using such anti-buckling cables, and electric-drive vehicles equipped with traction battery packs having impact-attenuating shear plates tethered together by anti-buckling cables. For instance, there are disclosed vehicle battery systems that utilize battery containers with structural features for managing dynamic load cases (e.g., compression, torsion, etc.) during vehicle impact events. Structurally optimizing the vehicle chassis with a load-bearing battery system design helps to reduce gross vehicle weight (GVW) which, in turn, leads to improvements in overall vehicle efficiency and increased driving range. In an example, a structural battery container—be it a battery pack case, a battery module housing, or other applicable battery container configuration—may be sandwiched between top and bottom shear plates that mount the battery container to the vehicle frame and facilitate impact attenuation. The shear plates cooperatively increase the strength and stiffness of the vehicle chassis, e.g., to meet vehicle-level impact performance requirements.

To optimize the vehicle's impact-mitigating capabilities, a low-cost, low-weight cable system is employed to tether together the vertically spaced shear plates to help ensure that the plates do not buckle during loading. Doing so will help to maintain the plates' parallel orientation so that loads are transferred efficiently through the battery structure. By way of example, and not limitation, a rectangular array of electrically non-conductive cables fastens to the top shear plate, extends through the internal cell compartment while threading between gaps in the clustered battery cells, and fastens to the bottom shear plate. Each cable may be fabricated from a roving or tow of electrically insulative glass (E-glass) fibers or other non-conductive fiber material (e.g., aramid, PET, etc.), and may be pre-tensioned prior to final assembly into the battery container. The anti-buckling cables may be attached under tension to the two shear plates using adhesive buttons or thermoplastic resin anchors. Each fiber tow may be threaded through an aligned pair of holes in the shear plates, and nests in gaps between the cell cases of neighboring battery cells. Vertical guide straws may be packaged inside the battery container to facilitate insertion and anchoring of the cables. The gauge, number, location, and spacing of the cables may be selectively varied to optimize anti-buckling performance.

Aspects of this disclosure are directed to anti-buckling, non-conductive cabling arrangements for shear plates of battery assemblies. In an example, a load-bearing battery assembly is presented, e.g., for powering an electrified powertrain and structurally reinforcing a chassis frame of a motor vehicle. The battery assembly includes multiple battery cells, such as staggered arrays or parallel stacks of lithium-class prismatic, pouch, or can-type cells. These battery cells are housed inside a protective battery container that may provide various functionality, including electrical insulation, weatherproofing, active/passive cooling, etc. A pair of (first and second) shear plates is attached to opposing sides of the battery container, sandwiching therebetween the battery cells. Unlike standard battery covers and base plates, which provide little or no load-dissipating capabilities, shear plates may be fabricated as rigid, substantially flat panels having sufficient gauge and no buckle-initiating surface features. This allows a shear plate to carry and attenuate in-plane loads many times higher than the plate's own mass. One or more tether cables extend through the battery container and each rigidly secures at opposing ends thereof to the shear plates. Unlike battery sense line assemblies and wiring harnesses, these tether cables are electrically non-conductive and structurally join together the mutually parallel shear plates. An attendant benefit for disclosed concepts includes improving a vehicle's capacity to attenuate or disperse dynamic loads without undue deflection or distortion of the chassis frame by utilizing the traction battery pack as a vehicle structural member.

Additional aspects of this disclosure are directed to motor vehicles with lithium-class traction battery packs that employ any of the herein described anti-buckling cables and cable systems. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle.

Continuing with the preceding discussion, the vehicle employs a rechargeable traction battery pack that is attached to the vehicle body, e.g., via a housing or tray mounted onto the vehicle chassis, and electrically connected to the traction motor(s), i.e., to transmit electrical energy thereto. The traction battery pack includes, for example, an array of rechargeable electrochemical battery cells that is housed inside a protective battery container. The battery container includes multiple sidewalls that are interconnected to partially or completely surround the battery cells. Top and bottom shear plates are attached to opposing top and bottom sides, respectively, of the battery container in order to sandwich therebetween the battery cells. A rectangular array of tether cables extends through the battery container with each cable rigidly secured at opposing ends thereof to the two shear plates. These tether cables are electrically non-conductive, have a high tensile strength (e.g., ultimate tensile strength of at least 1000 lbs. per square inch (Psi) or at least 6.9 megapascals (MPa)), and structurally join the top shear plate to the bottom shear plate.

Aspects of this disclosure are also directed to manufacturing workflow processes for making and computer readable media (CRM) or control logic for using any of the disclosed cable systems, battery assemblies, and/or motor vehicles. In an example, a method is presented for constructing a battery assembly. This representative method includes, in any order and in any combination with any of the above and below disclosed options and features: fabricating, assembling, accepting, or retrieving (collectively "receiving") a plurality of battery cells and a battery container; placing the battery cells inside the battery container; attaching first and second shear plates to opposing first and second sides, respectively, of the battery container such that the first and second shear plates sandwich therebetween the battery cells; threading a plurality of tether cables through the battery container; and rigidly securing each of the tether cables at opposing ends thereof to the first and second shear plates, wherein the tether cables are electrically non-conductive and structurally join the first shear plate to the second shear plate.

For any of the disclosed systems, methods, and vehicles, each of the tether cables may be placed in continuous tension (i.e., "pretensioned") between the vertically spaced shear plates. As another option, each tether cable originates at one shear plate, extends rectilinearly through the internal cell compartment of the battery container, and terminates at the other shear plate. Additionally, the battery cells may be arranged in neighboring rows and columns (e.g., staggered or squared); in this instance, each of the tether cables may thread between a respective neighboring pair of battery cells.

For any of the disclosed systems, methods, and vehicles, each tether cable may be fabricated as a discrete unitary structure using an electrically non-conductive flexible fibrous material. This flexible fibrous material may include, for example, electrically insulative glass fibers, dielectric polyamide fibers, polymer-sheathed metallic rope, thermoplastic fiber rods, combinations thereof, composite weaves, etc. Multiple guide straws may be located inside the battery container, extending vertically between the two shear plates. In this instance, each guide straw receives therethrough a respective one of the tether cables, e.g., to facilitate the insertion, threading, tensioning and anchoring of the individual cables. An assortment of different joining techniques may be used to rigidly secure the cables to the shear plates, including adhesive beads, thermoplastic resin anchors, fasteners, crimps, loops, knots, etc., each of which rigidly secures a respective end of a tether cable to one of the shear plates.

For any of the disclosed systems, methods, and vehicles, the shear plates are fabricated with an engineered pattern of through holes; each of these through holes is vertically aligned with a hole in the opposing plate to form a mated hole pair. In this instance, each of the tether cables is threaded through a respective one of the mated hole pairs. As a further option, the tether cables may be arranged in multiple mutually parallel rows and multiple mutually parallel columns as a square or rectangular array of tether cables. It is also within the scope of this disclosure to use other arrangements or, if desired, a single cable. Each of the shear plates may consist essentially of a substantially flat panel that is fabricated, in whole or in part, from a rigid metallic material as a single-piece structure.

For any of the disclosed systems, methods, and vehicles, the battery container may include an electrical interconnect board (ICB) assembly that is interposed between the top (first) shear plate and the battery cells; the ICB assembly electrically interconnects the battery cells and may also provide sensing and control functionality. A cell carrier panel may be interposed between the bottom (second) shear plate and the battery cells; the cell carrier panel buttresses thereon the battery cells. As noted above, the battery container may include multiple container sidewalls that are joined together to at least partially surround the battery cells. The container sidewalls may include laterally spaced side rails that are joined at opposing ends thereof to longitudinally spaced fore and aft rails. The side rails mount the battery container to rocker sections of a vehicle chassis, and the fore and aft rails mount to front and rear bulkhead sections, respectively, of the vehicle chassis.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
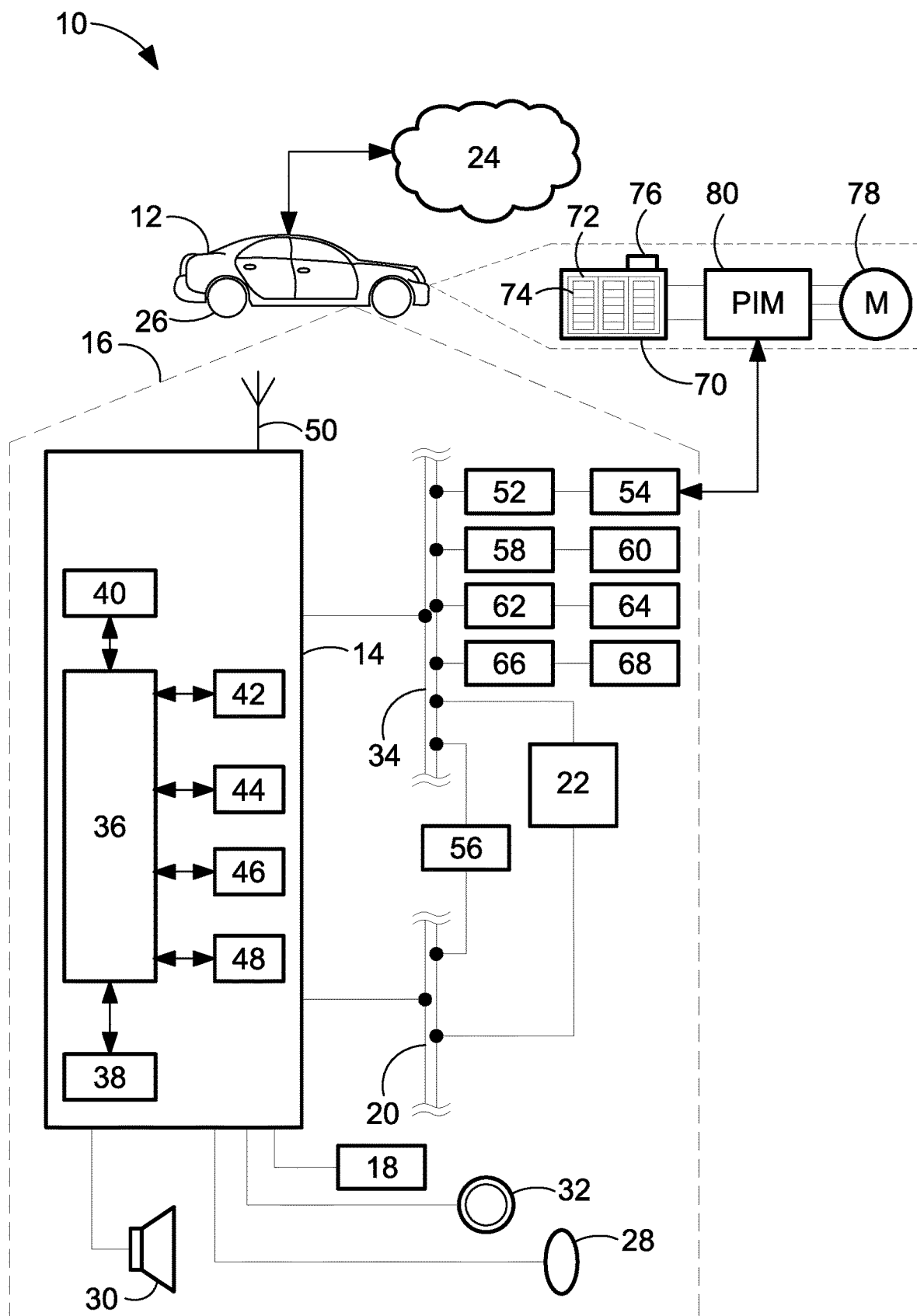
FIG. 1 is a partially schematic, side-view illustration of a representative motor vehicle with an electrified powertrain and a rechargeable traction battery pack having impact-attenuating shear plates for structurally reinforcing the vehicle chassis according to aspects of the disclosed concepts.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of vehicle, and utilized for both automotive and non-automotive applications alike. Moreover, only select components of the motor vehicles, battery assemblies, and cable systems are shown and described in additional detail herein. Nevertheless, the vehicles, assemblies, and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite services, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, touchscreens, joysticks, pedals, etc.). These hardware components 16 may function as a human/machine interface (HMI) that enables a user to communicate with the telematics unit 14 and other components resident to and remote from the vehicle 10. A microphone 28, for instance, provides occupants with a means to input verbal or other auditory commands. Conversely, a speaker 30 provides audible output to a vehicle occupant and may be either a stand-alone speaker dedicated for use with the telematics unit 14 or may be part of an audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating a brake system, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a wireless modem, or a navigation and location chipset/component (e.g., global positioning system (GPS) transceiver), all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor (M) 78 that is operatively connected to a rechargeable energy storage system (RESS), which may be in the nature of a chassis-mounted traction battery pack 70. The traction battery pack 70 of FIG. 1 employs one or more battery modules 72, each of which contains a group of battery cells 74, such as stacked lithium-class, zinc-class, nickel-class, or organosilicon-class battery cells of the prismatic, pouch, or cylindrical type. One or more prime movers, such as traction motor (M) 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to both HEV and ICE-based powertrains. Module management, cell sensing, and module-to-module or module-to-host communication functionality may be integrated directly into each battery module 72 and performed by an integrated electronics package, such as a wireless-enabled cell monitoring unit (CMU) 76.

Vehicle 10 may be originally equipped with a rigid floor pan (not visible) that extends across the top of the battery pack 70, e.g., to separate the power-generating electrochemical cells 74 within the modules 72 from the occupants of the passenger cabin. An underbody skid plate (also not visible) may be mounted underneath the pack 70, e.g., to protect the battery system from water, snow, road debris, etc. The floor pan, skid plate, and battery pack 70 may be anchored to a vehicle chassis frame that supports thereon or, alternatively, is unified with select portions of the vehicle body 12 (e.g., in a unibody frame construction). The battery pack 70 incorporates structural features for managing dynamic load cases, such as non-harmonic and non-periodic compression and torsion loads, during vehicle impact events. As described in extensive detail below, the battery pack 70 system may implement a structural design with a battery container that is sandwiched between impact-attenuating shear plates, which may assist with mounting the pack 70 to the vehicle frame. For instance, the top shear plate may be utilized to form some or all of a passenger compartment floor pan, whereas the bottom shear plate may be utilized to form some or all of an undercarriage skid plate.

Many battery pack containers are multi-sided constructions that are sealed on top and bottom sides thereof with a stamped housing cover and a contoured housing base. Standard battery pack covers and bases, however, contribute little or no meaningful structural benefit to the battery assembly or to the vehicle's body structure for impact loading events; rather, the primary functions of the cover and tray are cell retention, electrical isolation, and weather-resistant sealing. Consequently, most conventional battery container covers and trays are made out of lightweight materials with thin gauges and typically possess formed features or reinforcements so that they are sufficiently stiff to carry the pack's weight and nothing more. A shear plate, by contrast, is fabricated from high-strength rigid materials with sufficient gauge/cross-sectional area to carry in-plane loads many times larger than the pack's own mass. Moreover, most shear plates omit surface contours, formed features, and cutout sections as they create initiation points for buckling during loading.

To optimize the vehicle's impact-mitigating capabilities during dynamic loading, a low-cost, low-weight cable system tethers together the vertically spaced shear plates to help ensure that the plates do not buckle during loading. By precluding buckling while maintaining a vertically spaced and mutually parallel orientation of the shear plates, the anti-buckling cable system maximizes the pack's and, thus, the vehicle's ability to attenuate side and frontal loads. During pack assembly, vertically aligned through holes are machined into the top and bottom shear plates. A tether cable, such as a tow of high-tensile-strength wound fibers or a thermoplastic fiber rod, is shot through the shear plates holes and intercell gaps inside the battery container. The cable is then anchored to one shear plate, pretensioned, and then anchored to the opposite shear plate. An alternative option would employ fiber tows that are pre-impregnated with thermoplastic resin. After the cables are inserted through the holes in the shear plates and placed in tension, a thermoforming process (e.g., ultrasonic or vibrational welding) is used to create an enlarged-diameter fiber-and-resin button on the outboard-side surfaces of the shear plates to anchor the cable to the plates.

Some commercially available battery pack designs use stringer rails or stanchion posts to prevent shear plate buckling, adding significant battery mass and costs while requiring additional packing space and redesign of the system's internal layout. In contrast, disclosed designs do not require any additional packing space and, thus, help to maximize the number of cells in the pack while minimizing the total system mass without impacting the internal parts or architecture of the battery assembly. Creepage and clearance issues are negated by this design since the tether cables are non-conductive and have high-tensile strengths; consequently, the cables may be packaged in tight spaces between the individual cells where bolts and other metal parts may not. In addition to reducing the cost per vehicle and simplifying pack design, disclosed anti-buckling cable systems help to improve vehicle range by maximizing energy density.

Figure 2:
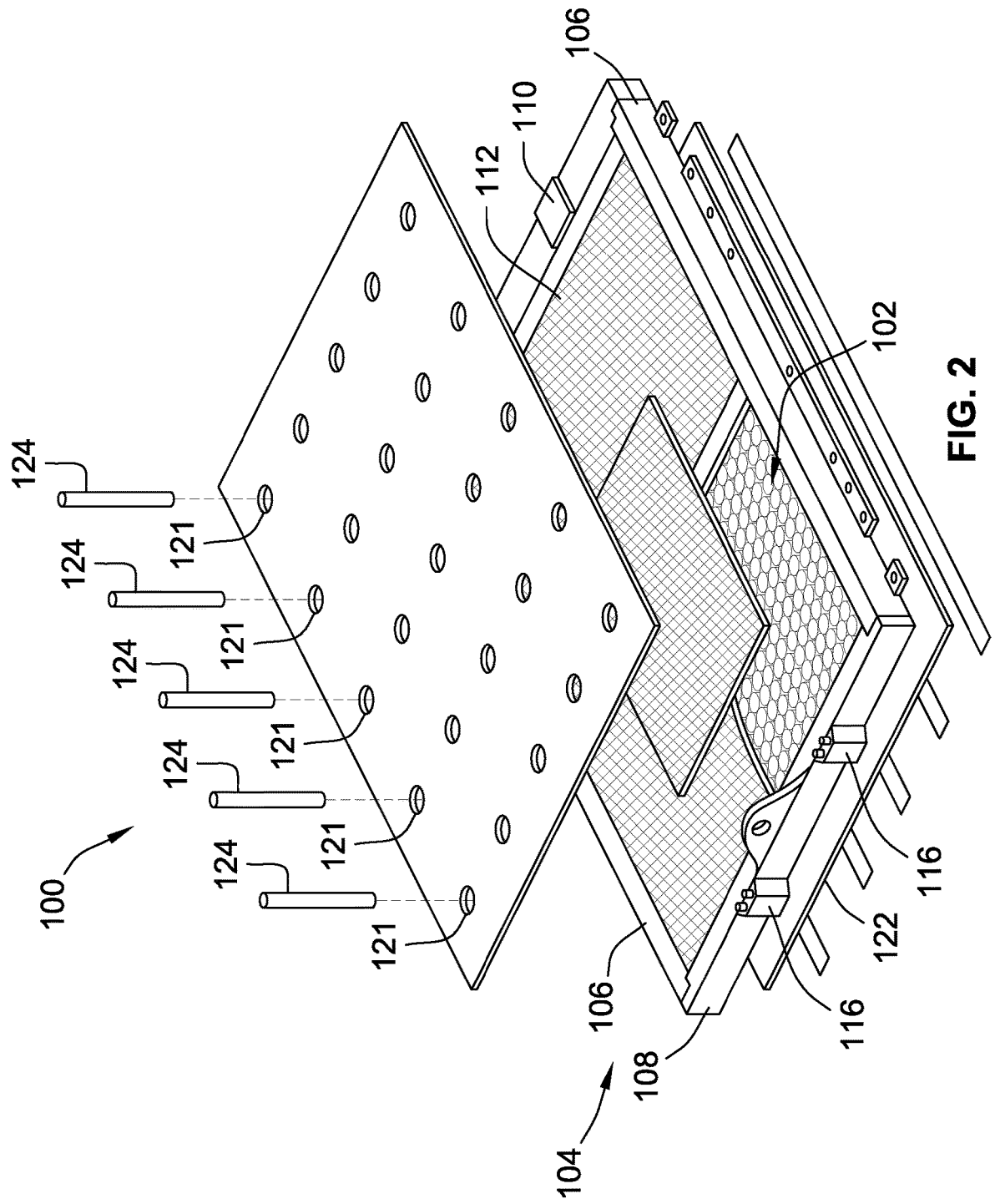
FIG. 2 is a partially exploded, perspective-view illustration of a representative traction battery pack assembly with top and bottom shear plates tethered together by an anti-buckling cable system in accord with aspects of this disclosure.
Figure 3:
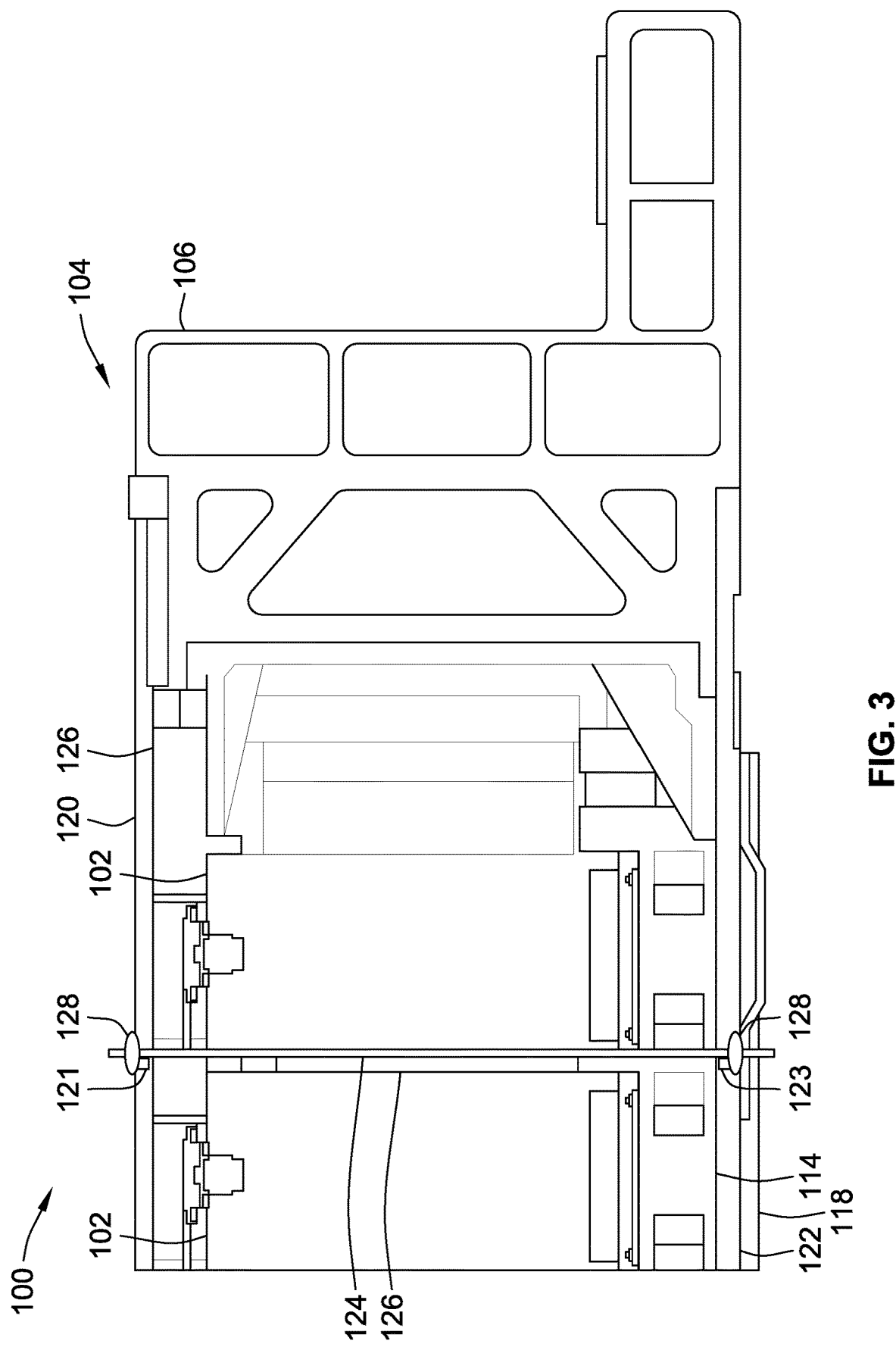
FIG. 3 is an enlarged, side-view illustration of a portion of the representative traction battery pack assembly of FIG. 2 taken in partial cross-section to show one of the anti-buckling cables tethering together the top and bottom shear plates.

Turning next to FIGS. 2 and 3, there is shown a segment of a rechargeable energy storage system (RESS) in the form of a traction battery pack (or "battery assembly") 100 that is adapted for storing and supplying high-voltage electrical energy used, for example, to propel an electric-drive vehicle, such as the all-electric automobile 10 of FIG. 1. This battery pack 100 may be representative of a deep-cycle, high-ampere capacity vehicle battery system rated for approximately 350 to 800 VDC or more, for example, depending on a desired vehicle range, gross vehicle weight, and power ratings of the various accessory loads drawing electrical power from the RESS. To this end, the pack 100 may be electrically connectable to an electrical load or an electrical source, or both, such as polyphase permanent magnet (PM) electric machines of other form of electric traction motor (M) 78. Each traction battery pack incorporates an aggregation (e.g., 100's or 1000's) of discrete electrochemical cells connected in series and/or parallel to achieve the desired total voltage and total current requirements.

The traction battery pack 100 of FIGS. 2 and 3 is generally typified by an assemblage of electrochemical battery cells that is housed inside a protective battery container. In the illustrated example, a staggered cluster of lithium-class battery cells 102 is arranged in a rectangular array and securely stored inside a battery pack housing 104. The housing 104 may be constructed of a metallic, polymeric, or fiber-reinforced polymer (FRP) material, including combinations thereof, to satisfy various mechanical, manufacturing, and thermal design specifications. The battery housing 104 may have a relatively flat and lightweight construction with a hexahedral shape, as shown, or may be constructed in other regular and irregular geometric configurations for accommodating application-specific parameters. Likewise, the battery assembly 100 may contain a cluster of staggered lithium-ion cylindrical can cells that share a common housing, as shown, or may contain stacks or individual modules of battery cells, may contain pouch-type cells, prismatic-type cells, or other cell form factor, and/or may employ other suitable battery technologies, such as those described above with respect to the battery cells 74 of FIG. 1.

According to the representative battery assembly configuration of FIG. 2, the battery pack housing 104 (also referred to herein as "battery container") is generally composed of multiple sidewalls that cooperate with topside and bottomside covers to collectively encase the battery cells 102. In particular, the pack housing 104 includes a pair of rocker section side rails 106 that are spaced laterally from each other and extend longitudinally along the length of the vehicle chassis. Opposing front and rear ends of each side rail 106 are joined, e.g., via threaded fasteners, to fore and aft bulkhead rails 108 and 110, respectively, which are spaced longitudinally from each other and extend laterally across the width of the vehicle chassis. The two side rails 106 mount the battery pack 100 to rocker sections of a vehicle chassis, whereas the fore and aft rails 108, 110 mount the pack 100 to front and rear bulkhead sections of the vehicle chassis.

An integrated electrical interconnect board (ICB) assembly 112 is seated on top of the battery cells 102, interposed between a top (first) shear plate 120 and the array of battery cells 102. The integrated ICB assembly 112 may simultaneously function as an electrically insulating, cell holding, cell sensing, and cell bussing solution that electrically connects the battery cells 102 in series or in parallel. Optional ICB hardware may include a flexible integrated circuit (FIC) sensing package (not shown) with an assortment of battery operating sensors, such as voltage, current, and temperature sensing devices. A senseline assembly (not shown) with electrical traces and pads operatively connects the FIC sensing package with select cells or cell groups of the pack 100. Bus connectors 116 on the fore/aft rail 108, 110 electrically connect the ICB assembly 112 to the vehicle's high-voltage electrical system.

Providing subjacent support for the battery cells 102 is a cell carrier panel 114 (FIG. 3), which is interposed between a bottom (second) shear plate 122 and the bottom faces of the battery cells 102. The cell carrier panel 114 may be an eggcrate-like structure that physically buttresses the battery cells 102 and, if desired, may be formed from a thermally conductive material that facilitates dissipation of cell-generated heat or front a thermally resistive material to prevent heat transfer under a thermal runaway propagation (TRP) event. In addition, the cell carrier panel 114 may provide both a shock-absorbing clearance between the bottom shear plate 122 and the cells 102 and a thermal gap for evacuating from the system hot air and gases that may be generated during a thermal event. An optional thermoplastic composite doubler plate 118 (FIG. 3) may be pin-jointed, adhered, fastened, or riveted to a ground-facing underside surface of the bottom shear plate 122 to provide additional protection for the battery pack 100 assembly.

Acting as a physical barrier between the passenger cabin and battery pack 100, a top (first) shear plate 120 is attached onto a top (first) side of the battery pack housing 104 to thereby cover an inboard-facing top surface of the ICB assembly 112. Acting as a protective underbody panel for the chassis and as a protective shield for the underside of the traction battery pack 100, a bottom (second) shear plate 122 is attached onto a bottom (second) side of the housing 104 opposite that of the top shear plate 120 to thereby cover an outboard-facing bottom surface of the cell carrier panel 114. With this arrangement, the two shear plates 120, 122 sandwich therebetween the battery cells 102, e.g., without physically contacting any of the cells 102. In the illustrated example, each shear plate 120, 122 consists essentially of a substantially flat panel sans surface contours, cutout sections, or formed features so as to optimize in-plane load dissipation across the plates 120, 122. The shear plates 120, 122 may each be fabricated, in whole or in part, from a rigid metallic material (e.g., high-strength, low-alloy (HSLA) steel, aluminum/titanium composite, etc.) as a single-piece structure. While not per se required, it may be desired that the two shear plates 120, 122 are substantially structurally identical to each other, e.g., for ease of manufacture and simplicity of design.

To help prevent buckling of the chassis-strengthening shear plates 120, 122 during horizontal loading of the vehicle, an engineered pattern of tether cables 124 extends through the battery pack housing 104 and each rigidly secures at opposing ends thereof to the shear plates 120, 122. In so doing, the cables 124 physically join the two shear plates 120, 122 at multiple points across the major faces of their polyhedral structures in order to minimize out-of-plane failure thereof. So as to not interfere with the charge and discharge cycles of the battery cells 102, it may be desirable that the tether cables 124 are electrically non-conductive or, at a minimum, are sheathed in an electrically insulating material. For instance, each tether cable 124 may be fabricated, in whole or in part, from an electrically non-conductive flexible fibrous material to form an elongated and discrete, cord-like structure. This flexible fibrous material may include, for example, electrically insulative glass (E-glass) fibers, dielectric aromatic polyamide (aramid) fibers, nylon fibers, polyethylene terephthalate (PET) fibers, polymer-sheathed metallic rope, weaves and composite weaves, combinations thereof, or a single enlarged strand of any one of the foregoing options, etc.

A variety of weave geometries may be employed to form the tether cables 124 in order to enable sufficient tensioning of the cables 124 without succumbing to significant creep deformation over the use life of the battery pack 100 assembly. To that end, the weave geometry (e.g., 3-strand twisted, 8-strand plaited, 12-strand braided, core-dependent double braid, etc.) and material or material combination (e.g., core cable surrounded by braided or twisted strands) of the tether cables 124 may be selected to optimize the cable's mechanical properties and long-term behavior. It is also envisioned that each tether cable 124 may consist essentially of the woven non-conductive flexible fibers or, if desired, may consist essentially of a single low-gauge strand of a high-tensile strength, non-conductive material. Optionally, some or all of the herein-described tether cables may be part of a single strand that is threaded in-and-out of the battery pack housing 104 and across the faces of the shear plates 120, 122.

The tether cables 124 of FIGS. 2 and 3 are portrayed as discrete cord-like structures that each originates at the top (or bottom) shear plate 120, extends rectilinearly through the battery container 104, and terminates at the opposite bottom (or top) shear plate 122. During construction of the traction battery pack 100 assembly, these tether cables 124 are stretched across the internal cell compartment of the pack housing 104 and placed in continuous tension ("pretensioned") between the shear plates 120, 122. By way of example, and not limitation, the top shear plate 120 is machined with a rectangular array of (first) through holes 121 (FIG. 2), and the bottom shear plate 122 is machined with a matching rectangular array of (second) through holes 123 (FIG. 3). Each through hole 121 in the top plate 120 is vertically aligned with a respective hole 123 in the bottom plate 122 to thereby form a mated pair of holes. As best seen in FIG. 3, each tether cable 124 is threaded through one of the mated hole pairs, passing between a respective neighboring pair of the battery cells 102. For pack configurations that insert cooling ribbons 126 between the staggered rows of battery cells 102, the individual tether cables 124 may be routed between neighboring cells, between a cooling ribbon and one or more cells, between a cell and other internal battery structure, etc. It should be appreciated that the number, arrangement, gauge, routing, material composition, method of manufacture, etc., of the tether cables 124 may be individually or collectively varied to accommodate an infinite number of intended battery assembly applications.

A variety of available joining techniques may be employed to fixedly couple the tether cables 124 to the shear plates 120, 122. For instance, the cables 124 may be anchored to the plates 120, 122 using adhesive beads, thermoplastic anchors, mechanical fasteners, crimps, clamps, clips, loops, knots, etc., each of which rigidly secures a respective end of a tether cable 124 to one of the shear plates 120, 122. In FIG. 3, for example, an enlarged-diameter adhesive bead 128 is applied onto each end of the tether cable 124, seated against the outer face of a shear plate 120, 122, and covering the through hole 121, 123 through which extends the cable 124. When dried onto the plate 120, 122 faces and cable 124 ends, these beads 128 form rigid "buttons" that fixedly secure the opposing ends of the tether cables 124 to the shear plates 120 122. These cable joints may also operate to retain the tether cables 124 in tension by anchoring them on the outer sides of the shear plate 120, 122.

Figure 4B:
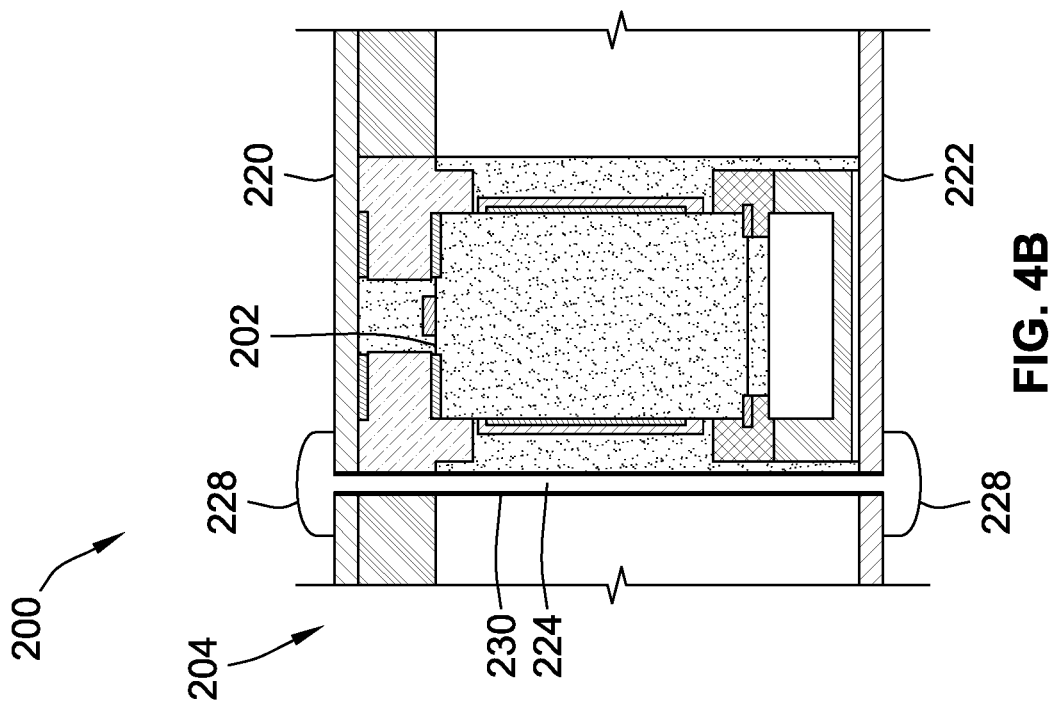
FIGS. 4A and 4B are schematic side-view illustrations of another representative battery assembly with shear plates tethered together by anti-buckling cables using guide straws for threading the cables (FIG. 4A) and thermoplastic resin anchors for securing the cables (FIG. 4B) in accord with aspects of the disclosed concepts.
Figure 4A:
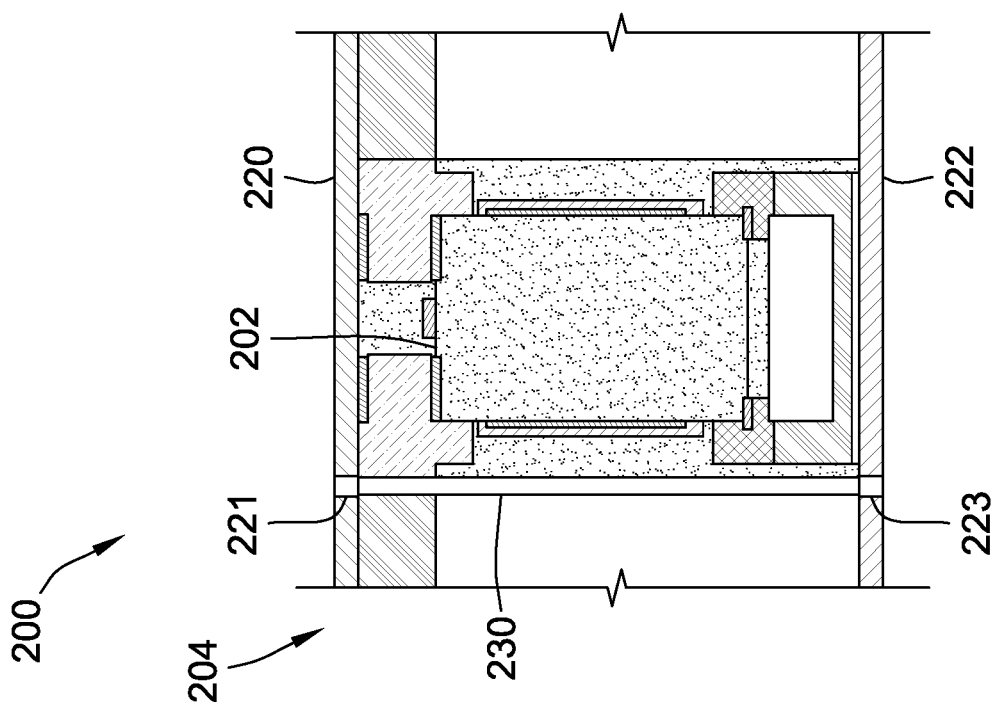

FIGS. 4A and 4B present schematic side-view illustrations of another representative battery assembly 200 with vertically spaced, mutually parallel shear plates 220, 222 that sandwich therebetween a group of battery cells 202 housed inside a protective battery container 204. Although differing in appearance, it is envisioned that any of the features and options described above with respect to the traction battery pack 100 of FIGS. 2 and 3 may be incorporated, singly or in any combination, into the battery assembly 200 of FIGS. 4A and 4B, and vice versa. For instance, the shear plates 220, 222 and tether cables 224 of FIGS. 4A and 4B may take on any of the structural options and alternative described above with respect to the shear plates 120, 122 and tether cable 124 of FIGS. 2 and 3. As a non-limiting point of demarcation, the battery assembly 200 utilizes a pair of thermoplastic resin anchors or "end caps" 228 that each rigidly secures a respective end of a tether cable 224 to one of the shear plates 220, 222.

Battery assembly 200 of FIG. 4A incorporates a rectangular array of elongated, tubular guide straws 230, each of which is located inside the battery container 204 and extends substantially orthogonally from interior faces of the top and bottom shear plates 220, 222. Each guide straw 230 receives therethrough one of the tether cables 224, e.g., to facilitate insertion and pretensioning of the cables 224 during construction of the battery assembly 200. For instance, these guide straws 230 may be prepacked inside battery container 204, located between neighboring cell pottings. The shear plates 220, 222 are thereafter properly positioned on opposing sides of the container 204 such that the mated pair of through holes 221, 223 in the plates 220, 222 align with opposing open ends of each guide straw 230. A pultruded thermoplastic composite strand, nylon fiber weave, E-glass tow, etc. is then passed through the hole 221 (223) in the top (or bottom) shear plate 220, down (up) through the guide straw 230, and out through the hole 223 (221) in the bottom (or top) shear plate 222. The top (or bottom) end of the tether cable 224 is then cut/sheared/clipped and anchored by one end cap 228, the tether cable 224 is stretched and tensioned, and then the bottom (or top) end of the tether cable 224 is cut/sheared/clipped and anchored by one end cap 228.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery assembly, comprising:
    a plurality of battery cells;
    a battery container housing therein the battery cells;
    first and second shear plates attached to opposing first and second sides, respectively, of the battery container and sandwiching therebetween the battery cells; and
    a plurality of tether cables extending through the battery container and each rigidly secured at opposing ends thereof to the first and second shear plates, wherein the tether cables are electrically non-conductive and structurally join together the first and second shear plates.

2. The battery assembly of claim 1, wherein each of the tether cables is continuously tensioned between the shear plates.

3. The battery assembly of claim 1, wherein each of the tether cables originates at the first shear plate, extends rectilinearly through the battery container, and terminates at the second shear plate.

4. The battery assembly of claim 1, wherein the battery cells are arranged in neighboring rows and columns, and wherein each of the tether cables threads between a respective neighboring pair of the battery cells.

5. The battery assembly of claim 1, wherein each of the tether cables is fabricated as a discrete structure from an electrically non-conductive flexible fibrous material.

6. The battery assembly of claim 5, wherein the flexible fibrous material includes electrically insulative glass fibers and/or dielectric polyamide fibers.

7. The battery assembly of claim 1, further comprising a plurality of guide straws located inside the battery container and extending between the first and second shear plates, each of the guide straws receiving therethrough a respective one of the tether cables.

8. The battery assembly of claim 1, further comprising a plurality of adhesive beads and/or thermoplastic resin anchors each rigidly securing a respective one of the ends of the tether cables to one of the shear plates.

9. The battery assembly of claim 1, wherein the first shear plate includes a plurality of first holes, the second shear plate includes a plurality of second holes aligned with the first holes as mated hole pairs, and each of the tether cables is threaded through a respective one of the mated hole pairs.

10. The battery assembly of claim 1, wherein the plurality of tether cables includes a square or rectangular array of tether cables arranged in multiple mutually parallel rows and multiple mutually parallel columns of tether cables.

11. The battery assembly of claim 1, wherein each of the shear plates is a substantially flat panel fabricated with a rigid metallic material as a single-piece structure.

12. The battery assembly of claim 1, wherein the battery container includes:
    an electrical interconnect board assembly interposed between the first shear plate and the battery cells and electrically connecting the battery cells; and
    a cell carrier panel interposed between the second shear plate and the battery cells and buttressing the battery cells.

13. The battery assembly of claim 1, wherein the battery container includes multiple container sidewalls interconnected to surround the battery cells, the container sidewalls including a pair of side rails joined at opposing ends thereof to fore and aft rails, the side rails configured to mount to rocker sections of a vehicle chassis, and the fore and aft rails configured to mount to front and rear bulkhead sections of the vehicle chassis.

14. A motor vehicle, comprising:
    a vehicle body;
    a plurality of road wheels attached to the vehicle body;
    a traction motor attached to the vehicle body and operable to drive one or more of the road wheels to thereby propel the motor vehicle; and
    a traction battery pack attached to the vehicle body and electrically connected to the traction motor, the traction battery pack including:
    an array of rechargeable electrochemical battery cells;
    a battery container housing therein the battery cells, the battery container including
    a plurality of container sidewalls interconnected to at least partially surround the battery cells;
    top and bottom shear plates attached to opposing top and bottom sides, respectively, of the battery container and sandwiching therebetween the battery cells; and
    a rectangular array of tether cables extending through the battery container and each rigidly secured at opposing ends thereof to the top and bottom shear plates,
    wherein the tether cables are electrically non-conductive and structurally join the top shear plate to the bottom shear plate.

15. A method of constructing a battery assembly, the method comprising:
    receiving a plurality of battery cells and a battery container;

placing the battery cells inside the battery container;

attaching first and second shear plates to opposing first and second sides, respectively, of the battery container such that the first and second shear plates sandwich therebetween the battery cells;

threading a plurality of tether cables through the battery container; and rigidly securing each of the tether cables at opposing ends thereof to the first and second shear plates, wherein the tether cables are electrically non-conductive and structurally join the first shear plate to the second shear plate.

16. The method of claim 15, further comprising tensioning each of the tether cables between the shear plates after threading the tether cables through the battery container.

17. The method of claim 15, wherein the battery cells are arranged in neighboring rows and columns, and wherein each of the tether cables threads between a respective neighboring pair of the battery cells.

18. The method of claim 15, further comprising fabricating each of the tether cables as a discrete structure from an electrically non-conductive flexible fibrous material.

19. The method of claim 15, further comprising:

locating a plurality of guide straws inside the battery container such that the guide straws extend between the first and second shear plates; and passing a respective one of the tether cables through each of the guide straws prior to rigidly securing the tether cables to the first and second shear plates.

20. The method of claim 15, wherein rigidly securing the tether cables includes applying a plurality of adhesive beads and/or thermoplastic resin anchors to the first and second shear plates such that each of the adhesive beads and/or thermoplastic resin anchors rigidly secures a respective one of the ends of the tether cables to one of the shear plates.

* * * * *